United States Patent
Yamamura et al.

(10) Patent No.: US 7,355,829 B2
(45) Date of Patent: Apr. 8, 2008

(54) OVERVOLTAGE PROTECTION CIRCUIT, AND POWER SOURCE, POWER SUPPLY SYSTEM AND ELECTRONIC APPARATUS USING THE OVERVOLTAGE PROTECTION CIRCUIT

(75) Inventors: Hideho Yamamura, Oiso (JP); Naoki Maru, Hadano (JP); Satoshi Tomioka, Nagaoka (JP); Motoharu Ueguri, Nagaoka (JP)

(73) Assignees: Hitachi, Ltd., Tokyo (JP); Densei-Lambda K.K., Tokyo (JP)

( * ) Notice: Subject to any disclaimer, the term of this patent is extended or adjusted under 35 U.S.C. 154(b) by 93 days.

(21) Appl. No.: 10/935,277

(22) Filed: Sep. 8, 2004

(65) Prior Publication Data

US 2005/0078424 A1    Apr. 14, 2005

(30) Foreign Application Priority Data

Sep. 8, 2003    (JP)    ............................ 2003-314898

(51) Int. Cl.
*H02H 3/20*    (2006.01)
(52) U.S. Cl. .................................................. 361/91.1
(58) Field of Classification Search ................ 361/91.1
See application file for complete search history.

(56) References Cited

U.S. PATENT DOCUMENTS 4,618,779 A * 10/1986 Wiscombe .................... 307/60

FOREIGN PATENT DOCUMENTS

JP    59-127579    *    7/1984
JP    4-372525    12/1992

* cited by examiner

*Primary Examiner*—Robert L. Deberadinis
*Assistant Examiner*—Luis E. Roman
(74) *Attorney, Agent, or Firm*—Antonelli, Terry, Stout & Kraus, LLP.

(57) ABSTRACT

In a redundant configuration with multiple power sources connected in parallel to enhance reliability, a power source in which an overvoltage failure occurred has been difficult to identify and unable to be deactivated, which has impeded the improvement of reliability. However, it has become possible to deactivate selectively only the power source in which an overvoltage failure has occurred, by providing a independency-discrimination circuit that identifies the occurrence of the overvoltage failure by use of the state of a parallel operation control circuit, and connecting the independency-discrimination circuit, an overvoltage detection circuit, and a connection circuit.

18 Claims, 10 Drawing Sheets

OVERVOLTAGE PROTECTION CIRCUIT, AND POWER SOURCE, POWER SUPPLY SYSTEM AND ELECTRONIC APPARATUS USING THE OVERVOLTAGE PROTECTION CIRCUIT

CLAIM OF PRIORITY

The present application claims priority from the Japanese patent application JP2003-314898 filed on Sep. 8, 2003, the content of which is hereby incorporated by reference into this application.

BACKGROUND OF THE INVENTION

The present invention relates to an overvoltage protection circuit of a redundant parallel configuration, and to a power source, power supply system, and electronic apparatus using the overvoltage protection circuit.

A power source may be designed to take a redundant parallel configuration for improved reliability. When connecting multiple power sources in parallel to construct a power supply system of a parallel configuration in which the power sources are to be operated in parallel, more power sources than the N number of units actually required may be connected in parallel and operated in parallel (i.e., the power supply system may be designed into a redundant parallel configuration). Accordingly, even in the event of a power source failure, the power supply system does not stop and continues to operate for its improved reliability. When the improvement of power supply system reliability is achieved, the reliability of an electronic apparatus which incorporates the power supply system will improve and the quality of the service that the electronic apparatus provides will also improve. The redundant parallel configuration of power sources applies in cases such as operating N+1 power sources in parallel or operating a greater number of sources in parallel.

The conventional technologies for realizing the redundant parallel configuration include those which use parallel-use diodes (OR diodes). These technologies are described on, for example, page B-2 of "Comprehensive Catalog of Switching Power Supplies—2002" or pages B-214 to B-218 of "Application Notes on Parallel Operation", both created by Densei-Lambda K. K. According to these conventional technologies, parallel operation is realized by connecting a first terminal side (for example, an anode terminal) of one of multiple diodes in series to one of the output terminals (for example, high-potential side) of each power source and connecting second terminal sides (for example, cathode terminals) of the multiple diodes in common.

In addition, the technologies for realizing the redundant parallel configuration are already known. For example, as detailed in the UC3902 or UC3907 Data Sheets issued by Texas Instruments Incorporated or Unitrode Corporation or in the Application Notes "UC3907 Load Share IC Simplifies Parallel Power Supply Design" or "The UC3902 Load Share Controller and Its Performance in Distributed Power Systems" issued by the same companies, there exists a parallel operation technology for equalizing a load current between multiple power sources by monitoring the respective load currents and increasing the output voltage of the power source having a smaller load current. This parallel operation technology is used to operate the power sources in parallel, regardless of whether or not a redundant parallel configuration is employed.

Figure 1:
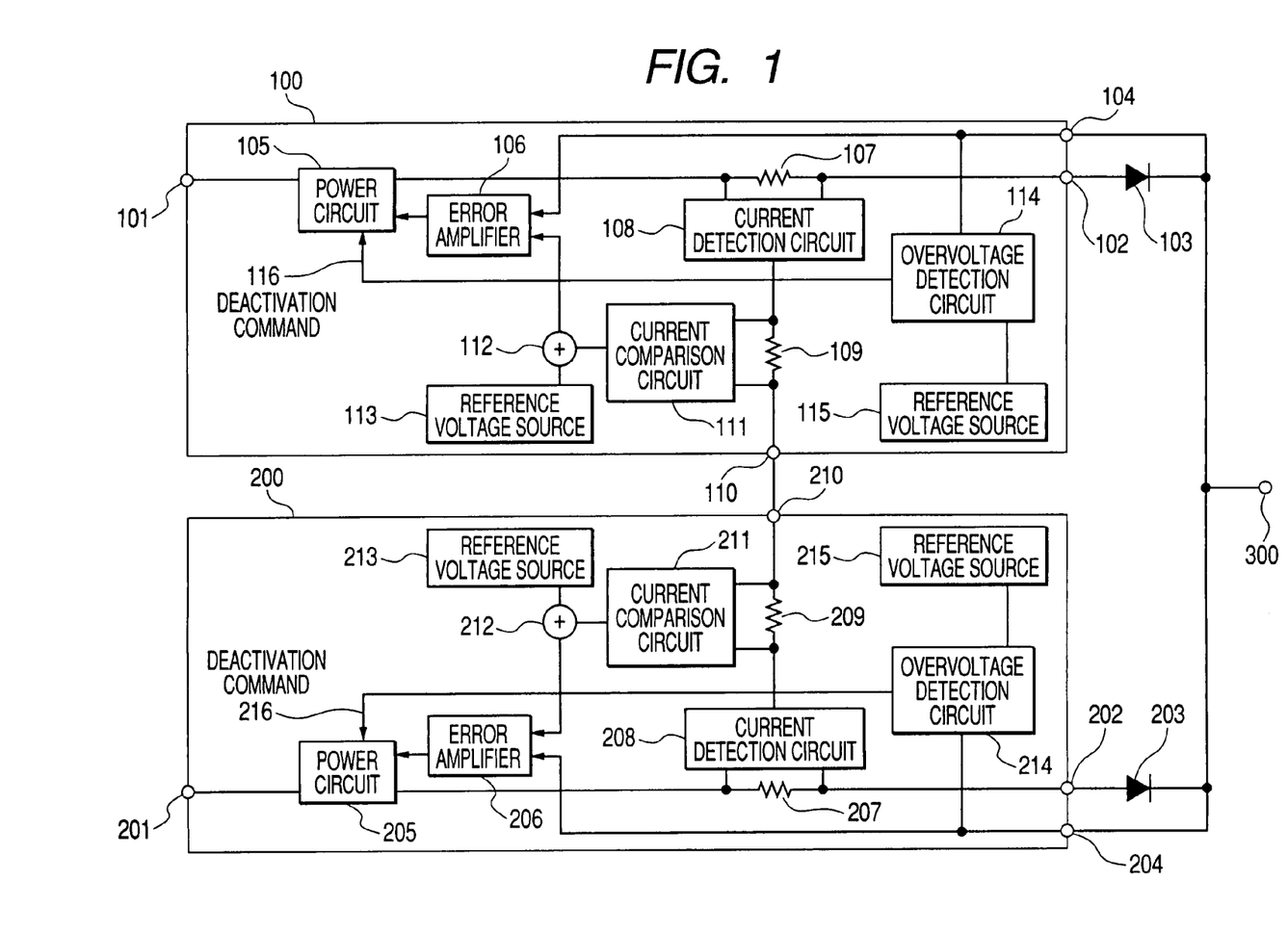
FIG. 1 is a diagram showing the conventional technology.

FIG. 1 is a functional block diagram of power sources, showing an example of a conventional technology. In this figure, power sources 100 and 200 are connected to take a redundant parallel configuration. In this example of a conventional technology, OR diodes 103 and 203 are connected in series to the output terminals 102 and 202 of both power sources, and the output terminal 300 of the power supply system is formed by connecting the cathode terminals of the OR diodes in common to realize the redundant parallel configuration. The parallel operation technology exists in the internal circuits of the power sources. Inside the power source 100, electric power from an input terminal 101 is output to the output terminal 102 via a power circuit 105. This power circuit functions as a voltage converter. At the same time, the power circuit performs the basic functions of the power source, such as stabilizing its output voltage, since the output voltage is controlled by an error amplifier 106 and since the voltage of a remote sense terminal 104 is controlled so as to equal the voltage sent from a reference voltage source 113. The current to the output terminal 102, i.e., the output current is detected at a resistor 107. The detected output current becomes an output current detection voltage in a current detection circuit 108, is output to a parallel operation control terminal 110 via a resistor 109, and coupled with a parallel operation control terminal 210 of the power source 200. Since both parallel operation control terminals 110 and 210 are connected, the voltage developed across the resistor 109 reflects the difference of the output currents between the power source 100 and the power source 200. This differential current is detected by a current comparison circuit 111, then the corresponding voltage is added to the reference voltage 113 by an adder 112, and the output voltage of the power circuit 105 is controlled. A current balance is thus taken for reduced differential output current. Parallel operation is realized by achieving a current balance between the power sources in this manner.

An overvoltage detection circuit 114 stops the operation of the power source to protect a load or the power source itself if a failure in the power source unusually increases the output voltage. This overvoltage detection circuit is a major constituting element of the overvoltage protection circuit provided within the power source and may include a deactivation circuit that operates when the output voltage decreases, and/or reporting circuits on the state and other factors of the power source, although these circuits are not shown. The overvoltage detection circuit, although connected to the cathode terminal of the OR diode in this circuit diagram, may be connected to the anode terminal instead. Alternatively, although this is not shown, the foregoing remote sense terminal may be omitted.

According to this conventional technology for realizing a redundant parallel configuration, if the output voltage is reduced by a failure in one power source, since the OR diode is reverse-biased, the corresponding power source is isolated from other normal ones to allow continued output of a required output voltage from the power supply system and continued normal operation of a section such as an electronic circuit provided as the load. Even if the failure is due to an event such as short-circuiting of a semiconductor, a capacitor, or the like, and results in short-circuiting across the output of a power source, the OR diode acts to prevent output current short-circuiting of other power sources, allowing the power supply system to continue to output the required output voltage. The fact that a power source has failed can be detected by using a method such as monitoring the output terminal 102 of the power source or an anode voltage of the OR diode 103, and it is also possible to deactivate the power source that has failed, and to report the failure to an external monitoring system.

Reliability of the power supply system of a redundant parallel configuration in the above case is calculated for trial below. The calculation assumes an arrangement of N+1 power sources, wherein N is 1 and two power sources are connected in parallel. The calculation also assumes that reliability "ë" of the individual power sources is expressed as 1,000 fit (failures in time) and that a "mean time to repair" (MTTR) in case of a power failure is 24 hours. Since a "mean time between failures" (MTBF) in a power source whose reliability is 1,000 fit is 1 million hours (approx. 114 years), either of the two power sources fails every 500,000 hours (57 years) on the average and is repaired or replaced with a new (normal) one during a repair time of 24 hours. Since the redundant configuration is disturbed during the repair time, if another power failure occurs during the time, the power supply system will be deactivated. The probability of this occurring, however, is about 1/40,000 (=24/1,000, 000), so the power supply system will be deactivated when the occurrence of a power failure and repair is repeated 40,000 times, i.e., once every 500,000 hours×40,000 times=20,000 million hours (approx. 2.3 million years). It follows that an ideal value of the reliability of this power supply system is 0.05 fit (MTBF=20 billion hours). For a power supply system not of a redundant parallel configuration, i.e., for a single power source, reliability is 1,000 fit. Use of such redundant parallel configuration technology as described above allows the reliability of a power supply system to be ideally improved from 1,000 fit to 0.05 fit, and the reliability improvement ratio obtained using the redundant parallel configuration technology is 1,000/0.05=20,000 times as an ideal value.

If N=4, redundant parallel connection of five power sources ideally yields 0.48 fit in terms of reliability, and 1,000 fit×4 units=4,000 fit is yielded in a non-redundant parallel configuration. A reliability improvement ratio of 4,000/0.48=8,333 times can therefore be obtained as an ideal value.

As described above, redundant parallel operation is very greatly effective for the improvement of reliability, provided that redundancy works well.

In addition to the above, a related technology is described in Japanese Patent Laid-Open No. Hei 4-372525.

SUMMARY OF THE INVENTION

Depending on the particular failure mode of the power source, however, the expected improvement in reliability may not be obtainable. The failure modes of power sources can be broadly divided into an undervoltage failure mode, which is a failure mode that reduces the output voltage, and an overvoltage failure mode, which is a failure mode that increases the output voltage. In the failure mode that reduces the output voltage, the conventional technology works as expected, and reliability improves. In the overvoltage failure mode, however, it may not be possible for the reliability of the power supply system to be improved using the conventional technology.

In the undervoltage failure mode, as described for the conventional technology, it is possible to isolate and/or deactivate the power source that has failed, and the power supply system can continue to supply a normal output voltage and current. In other words, the purpose of the redundant power configuration can be attained and the reliability of the power supply system can be improved significantly.

In the overvoltage failure mode, since the OR diode is biased in a forward direction, there is no isolating action and the power source that has failed continues to supply the output voltage. At this time, other normal power sources have their output currents balanced by the parallel operation mechanism, and their output voltages increase by being controlled to take the same value as the output voltage value of the power source that has failed, and the voltage of the entire power supply system increases as a result. A further increase in each output voltage eventually operates the overvoltage detection circuit usually equipped and makes the system judge the state to be abnormal and deactivate the power source. However, since each power source is controlled to the same output voltage, for which of the power sources the overvoltage detection circuit first operates is determined by factors such as component variation. For this reason, the overvoltage detection circuit of the power source which has failed does not always operate first and the overvoltage detection circuit of a normal power source may operate first. If a normal power source is thus deactivated, the power source which has failed continues to supply the output voltage. If the output voltage of the power source which has failed further increases, one more power source is deactivated by its overvoltage detection circuit. In this case, the number of power sources in continued operation is N−1. Therefore, the power supply system lacks the required output current capacity and does not function properly or is deactivated. The probability of the power supply system thus becoming unable to operate properly is 50% for N=1 with two power sources present in an N+1 arrangement. For N=4 with five power sources present, however, the power supply system stops with a probability of 80%. If it is considered, therefore, that the redundancy function fail and thus that an improvement in reliability cannot be expected, this would probably reflect an actual situation more appropriately in terms of average expected value.

In addition, if, during the above process, the output voltage of the power supply system increases and a section (such as an electronic circuit provided as the load) exceeds a permissible voltage range of the load circuit and malfunctions, since the power supply system was unable to maintain desired performance, there is no way but to deem the redundancy function to have failed, as was expected above.

In actuality, the failure mode of a power source is determined by the position, kind, and failure mode of internal electronic components which have failed to operate, and in general, the majority of the failures result in the undervoltage failure mode in which the output voltage is reduced. However, the present inventors have conducted surveys to find that nearly 10% to 20% of actual failures result in the overvoltage failure mode that increases the output voltage, and that the improvement in reliability by the adoption of the redundant parallel configuration is significantly degraded by the occurrence of these failures. Actual surveys on the frequency of occurrence of the overvoltage failure mode required caution. Because the overvoltage failure mode results ultimately in no-output state, if a survey is conducted after an overvoltage failure, the failure will be judged as having resulted in the undervoltage failure mode, since the overvoltage detection circuit is not operating at the time of survey and since the output voltage has decreased. To detect an overvoltage failure correctly, information on the fact that the overvoltage detection circuit has operated needs to be recorded by, for example, providing a latch circuit, a memory circuit, a log circuit or the like as a means for maintaining a record of the information. The present inventors have created the power sources that use such recording means, and have conducted many years of field surveying to find that overvoltage failures occur at a rate from 10% to 20%.

Reliability of the power supply system of a redundant parallel configuration in this case is calculated for trial below. If the same conditions as in the foregoing calculation are assumed and undervoltage failures occur at a rate of 80%, the reliability of the power supply system in this case is 0.05 fit, which is the same as in the foregoing case. Although the rate of overvoltage failures occurring is 20%, since two 1,000-fit power sources are present at this time, the total failure rate is 2,000 fit. At a rate of 50% of this value, the power source that has failed stops operating properly and reliability becomes 0.05 fit as in the foregoing case. At the remaining 50%, however, the normal power source is erroneously deactivated, which also results in the power supply system itself being deactivated. The reliability of the power supply system in this case, therefore, becomes 2,000 fit. Since overall reliability can be expressed as a weighted average of each component, it follows that 0.05 fit×0.8+0.05 fit×0.2×0.5+2,000 fit×0.2×0.5=200.045 fit, i.e., about 200 fit. This means that reliability improves only by up to five times the reliability of 1,000 fit in a non-redundant parallel configuration. This, in turn, indicates a significant decrease in the reliability improvement ratio since the reliability improvement ratio achievable in the redundant configuration assuming that the redundancy function 100% succeeds was 20,000 times.

Similarly, for N=4 with five power sources present, reliability of the power supply system against undervoltage failures is 0.48 fit, the same failure rate as that of the foregoing case. In the event of an overvoltage failure, since four normal sources among all five power sources may be erroneously deactivated, the failure ratio of this power supply system becomes (1,000 fit×5 units)×(4/5)=4,000 fit. For the remaining one among the five power sources, the power source that has failed is deactivated properly and the failure ratio thus becomes 0.48 fit. Since overall reliability can be expressed as a weighted average of each component, it follows that 0.48 fit×0.8+0.48 fit×(1/5)×0.2+(1,000 fit×5 units)×(4/5)×0.2=800.432 fit, i.e., about 800 fit. This means that compared with the reliability of 4,000 fit in a non-redundant parallel configuration, reliability improves only by up to five times. This, in turn, indicates a significant decrease in the reliability improvement ratio since the reliability improvement ratio achievable in the redundant configuration assuming that the redundancy function 100% succeeds was 8,333 times.

In addition, as mentioned above, if an increase in the output voltage of the power supply system causes a section (such as an electronic circuit provided as the load) to exceed the permissible voltage range of the load circuit and hence to malfunction, thus the power supply system may be unable to maintain desired performance. This results from 20% of all power failures, and for N=1 with two power sources present in the N+1 arrangement, reliability is 1,000 fit×2× 0.2=400 fit. This means that compared with the reliability of 1,000 fit of one power source in a non-redundant parallel configuration, reliability improves only by 2.5 times. In short, reliability does not improve much.

As described above, in the conventional technology for realizing a redundant parallel configuration, an overvoltage may result in the redundancy function failing, and this may significantly degrade the expected improvement in reliability.

In order to solve the above problem, a means is provided for selectively detecting the power circuit that has encountered the overvoltage failure, and deactivating only the power circuit that has encountered the overvoltage failure. This technology eliminates the possibility of normal power sources being erroneously deactivated in the event of an overvoltage failure, and makes the redundancy function successfully operate in all power failure modes, whereby the technology, compared with the conventional technology, significantly improve the reliability in a redundant parallel configuration.

More specifically, means for discriminating whether the output voltage of the local power source is being increased to follow up the output voltage of other power sources is provided in the power circuit and the means including a connection circuit for controlling the overvoltage detection circuit according to particular discrimination results is also provided as a connection circuit. Thus, whether the local power source is abnormal or not is selectively judged and the local power source is deactivated if abnormal.

Constructing a power supply system of a redundant parallel configuration using the power sources mentioned above makes it possible to improve the reliability of the power supply system. In addition, constructing an apparatus using this power supply system makes it possible to greatly reduce operational stops of the apparatus due to power source failures, thus improving reliability.

DESCRIPTION OF THE PREFERRED EMBODIMENTS

Embodiments of the present invention will be described in detail below using the accompanying drawings.

Figure 2:
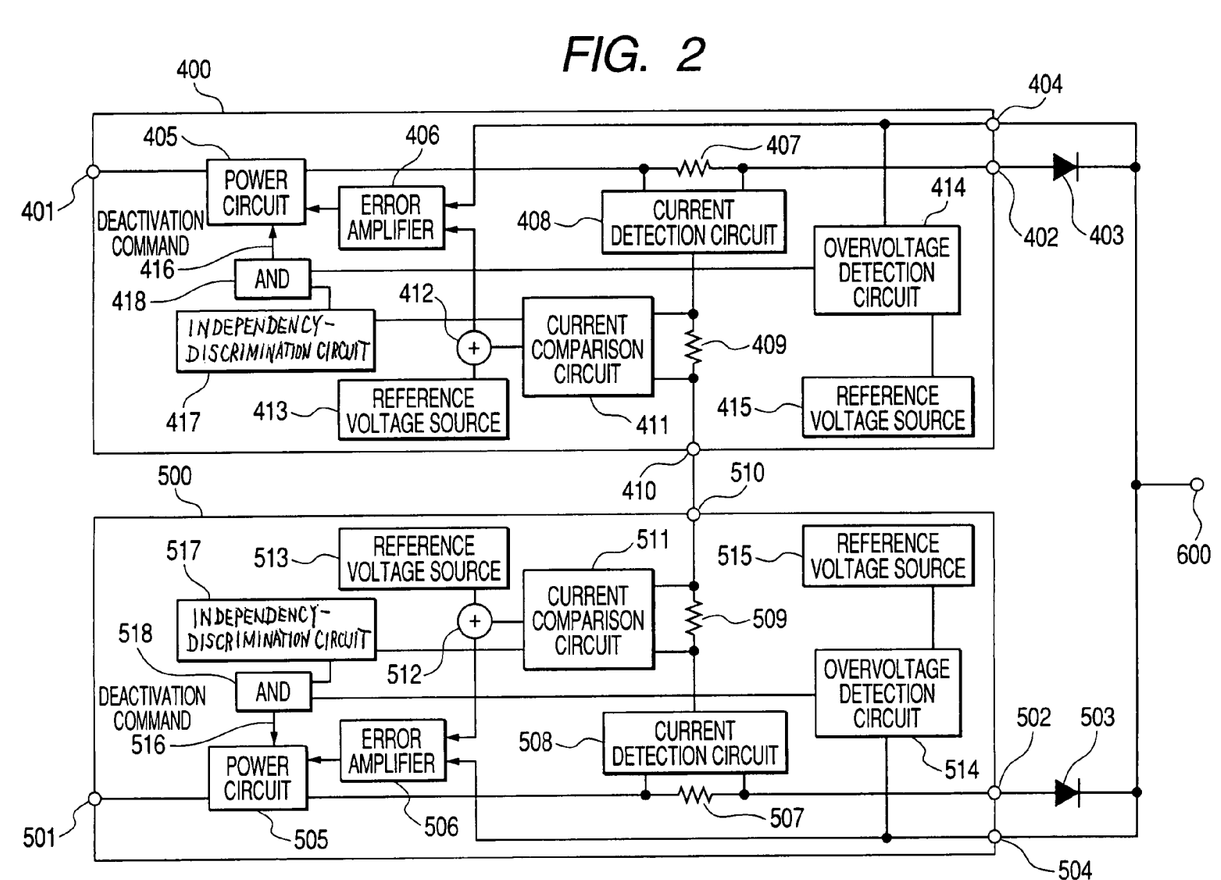
FIG. 2 is a diagram showing a first embodiment of the present invention.

FIG. 2 shows a first embodiment of the present invention. In FIG. 2, similarly to the conventional technology, output terminals of power sources 400 and 500 are connected to an output terminal 600 of a power supply system (hereinafter, referred to simply as the power system) via series-connected OR diodes 403 and 503 to realize the power system of a redundant parallel configuration. The first embodiment is characterized in that independency-discrimination circuits 417 and 517 and the connection circuits 418 and 518 functioning as AND circuits in this example, are provided in addition to the circuits of the conventional technology. In the first embodiment, in addition to overvoltage detection circuits 414 and 514, the independency-discrimination circuits 417 and 517 and the connection circuits 418 and 518 form an overvoltage protection circuit.

Internal operation of the power source 400 is described below. An input of the independency-discrimination circuit 417 is connected to a current comparison circuit 411. The current comparison circuit 411 provided for parallel operation compares an output current of the other (remote) power source and that of the local power source and outputs an analog signal for realizing a current balance. Observation of the output signal and the like, therefore, allows discrimination of whether the local power source has a low output voltage and the output current is low or has an output voltage higher than other power sources and thus its output current is larger than other power sources. In other words, it is possible to discriminate whether the output voltage of the local power source is higher or lower than that of other power sources. The independency-discrimination circuit 417 conducts the discrimination, and this circuit outputs a digital signal that indicates a true or false state. If an overvoltage failure occurs in the power source 400, since this power source becomes higher in voltage than other power sources, the output of the independency-discrimination circuit 417 in the power source 400 takes a true state. In this case, the outputs of the independency-discrimination circuit in all the other power sources takes a false state. Therefore, the power source 400 can identify itself or independency-discriminate that it is in an overvoltage state, and it is possible to deactivate selectively only the power source where the failure has occurred. And, by taking the logical product between the result of the above discrimination and the output of the overvoltage detection circuit 414 by the connection circuit 418 which is an AND circuit in this case, and using it as a signal of a deactivation command 416, it is possible to stop the operation of the power source where the overvoltage failure occurred. Conversely, the erroneous deactivation of normal power source can be avoided.

Reliability of this power system is calculated below. The calculation assumes the same conditions as those used when the reliability of the conventional power supply system was calculated. In the power system that uses the power sources of the present invention, a redundancy function successfully operates for all power failure modes, i.e., the redundancy function operates successfully, regardless of whether a failure occurs in an undervoltage failure mode or in an overvoltage failure mode. If reliability of both power sources is equivalent to 1,000 fit, therefore, the reliability of the power system takes the same value of 0.05 fit as that obtainable under an ideal state. In other words, the reliability is improved by 20,000 times by the redundant parallel configuration. Since the improvement of reliability in the conventional technology was five times, the technology according to the present invention, compared with the conventional technology, is effective in that reliability improves by 4,000 times.

Figure 3:
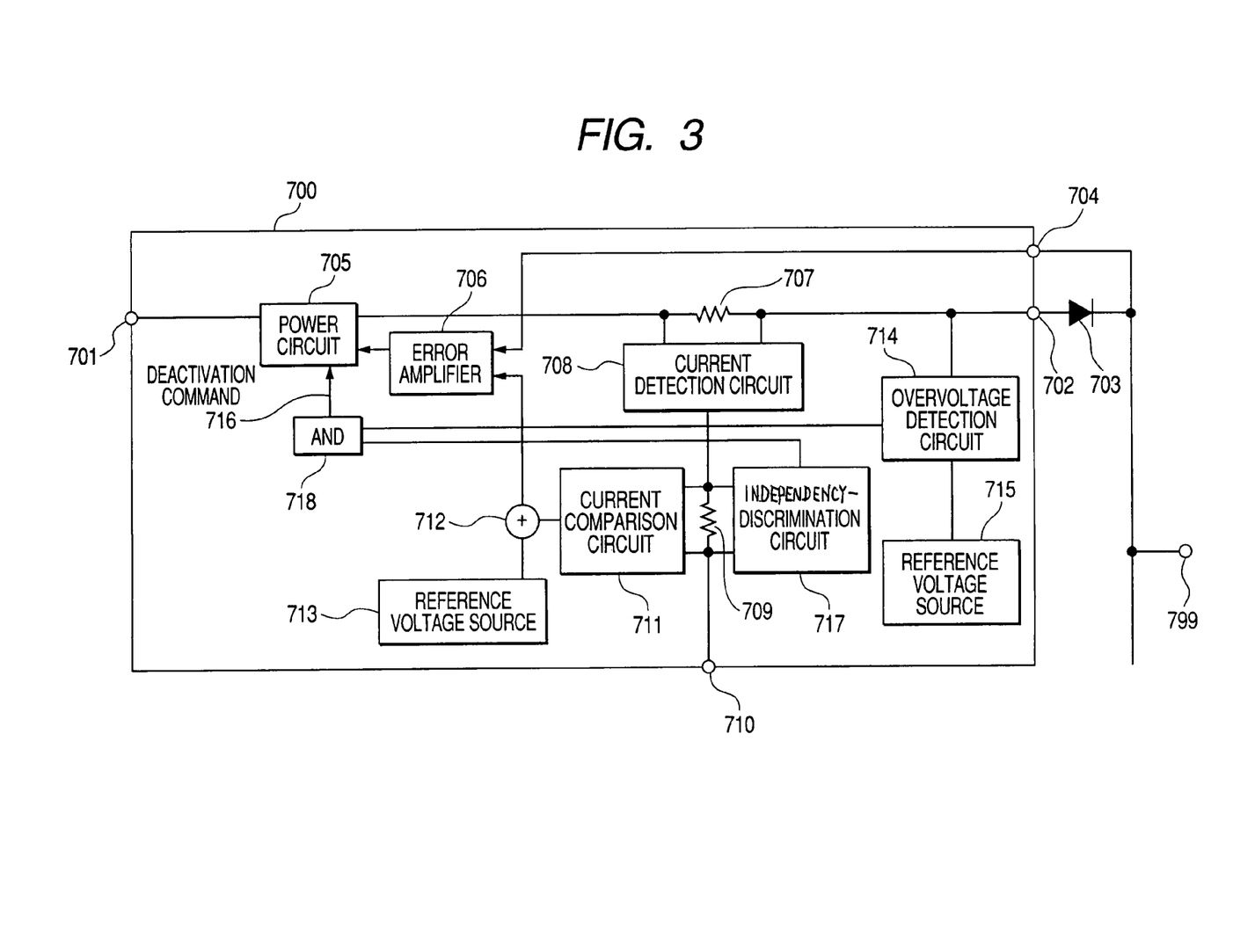
FIG. 3 is a diagram showing a second embodiment of the present invention.

FIG. 3 shows a second embodiment of the present invention, wherein a part of a power system, namely, a power source 700 is mainly shown. An output terminal 702 of the power source is connected to an output terminal 799 of the power system via an OR diode 703. A similar power circuit is connected to the output terminal 799 of the power system and hence realizes parallel operation. FIG. 3 differs from FIG. 2 in that an input of a independency-discrimination circuit 717 is taken from an input end of a current comparison circuit 711. The independency-discrimination circuit 717 monitors the voltage developed across a resistor 709 connected to the input of the current comparison circuit 711, and discriminates whether an output voltage of the local power source is higher or lower than that of other power source not shown. Only the power source where an overvoltage has occurred can be selectively deactivated. More specifically, this is possible by taking a logical product between the result of the above discrimination and an output of an overvoltage detection circuit 714 via the connection circuit 718 used as an AND circuit, then generating from the logical product a signal which functions as a deactivation command 716, and using this signal to stop the operation of the power source. Other circuit elements are the same as those of the first embodiment in terms of both composition and operation, and the improvement of reliability obtained are also the same as those of the first embodiment.

In the present second embodiment, an input of the overvoltage detection circuit 714 is connected to an anode of the OR diode 703. The overvoltage detection circuit 714 can also be connected to a cathode of the OR diode 703.

Figure 4:
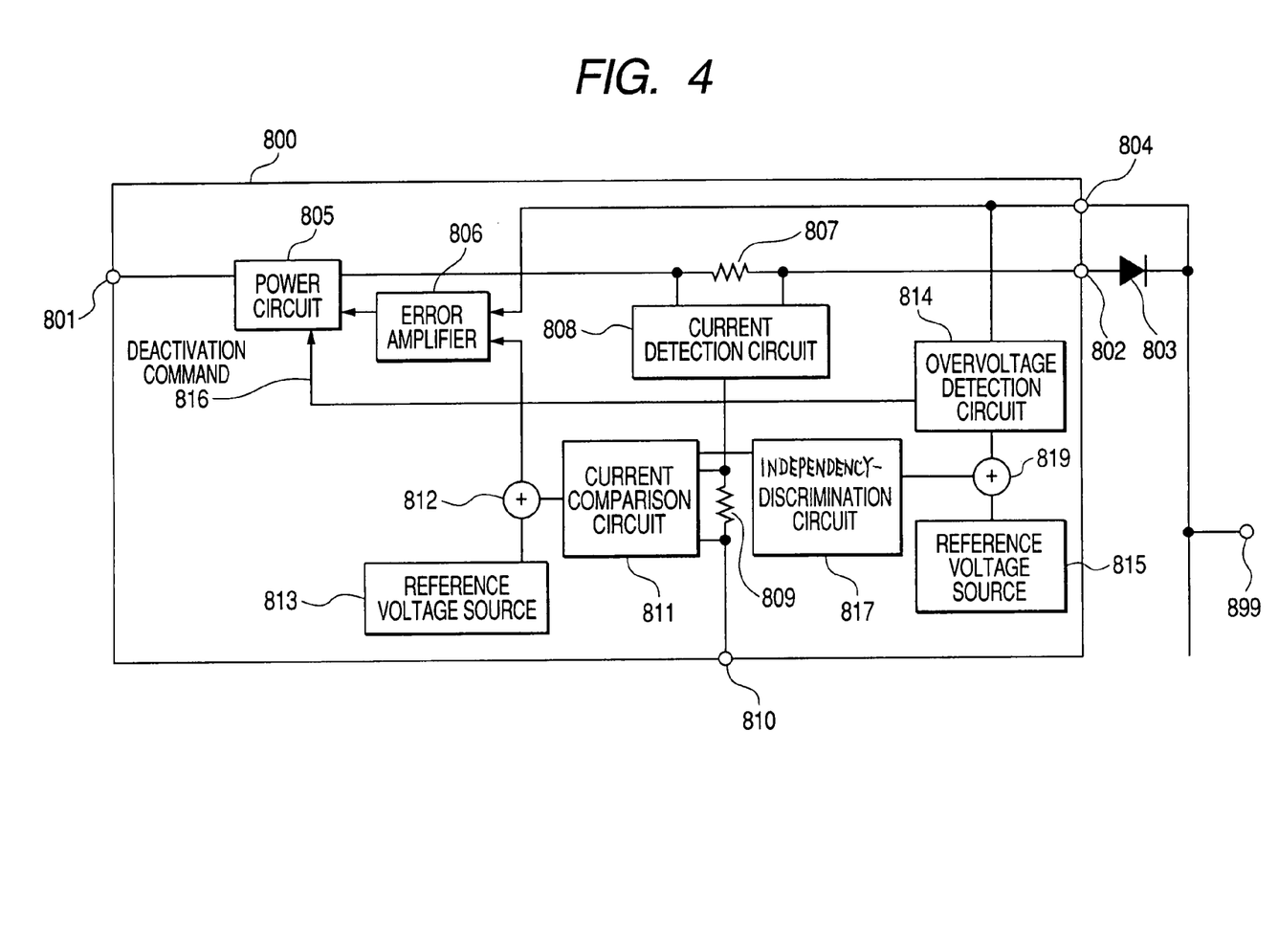
FIG. 4 is a diagram showing a third embodiment of the present invention.

FIG. 4 shows a third embodiment of the present invention, wherein a part of a power system, namely, a power source 800 is mainly shown. In FIG. 4, an input of a independency-discrimination circuit 817 is connected to a current comparison circuit 811 similarly to FIG. 2, whereas an output is connected to an addition circuit 819 which, as a connection circuit, adds a voltage to that of the reference voltage source 815 provided for an overvoltage detection circuit 814. The present embodiment is adapted such that when the independency-discrimination circuit 817 discriminates that an output voltage of the local power source is lower than that of the other (remote) power source, a voltage value for detecting an overvoltage is increased via the addition circuit in order for operation of the overvoltage detection circuit to change. Thus, an overvoltage detection circuit of the power source where an overvoltage failure has occurred operates first, hence preventing the other (normal) power source from being erroneously deactivated.

The benefit obtained in the third embodiment, namely, the reliability improvement value achieved is also the same as in the first embodiment.

In either embodiment, a detection voltage of the overvoltage detection circuit can be set to any voltage value. For example, if a permissible range of the voltage that a load circuit or the like requires is 75%, setting the detection voltage of the overvoltage detection circuit to 5% or less makes it possible for any changes in the output voltage of the power system to be controlled to 5% or less, even in the event of an overvoltage failure in either power source. This means that before or after or at the moment a power failure occurs, or in the course of the failure, or during the entire time from the occurrence of the failure, the power system can provide control for the output voltage to stay within its permissible fluctuation range and thus maintain the performance required. The electronic circuit (or the like) used as the load, therefore, can continue to operate without malfunctioning. The reliability improvement obtained in this power system is also the same as that of the first embodiment.

In addition, if a load current of the power system is zero or extremely small and the independency-discrimination circuit does not operate properly, the minimum current value required can be obtained by connecting a resistor or the like to the output terminal in order to solve that problem.

Figure 5:
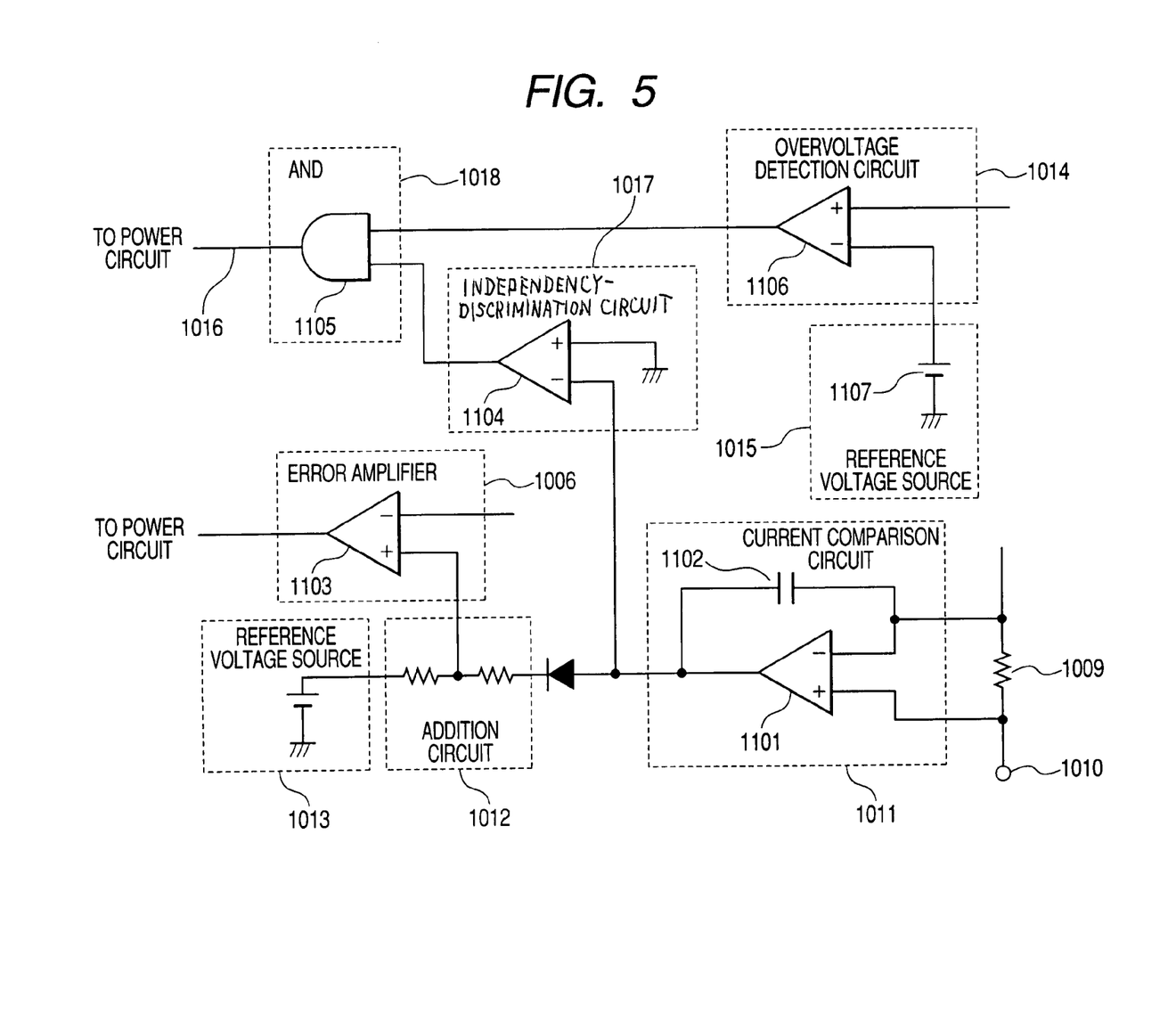
FIG. 5 is a diagram showing a fourth embodiment of the present invention.

FIG. 5 shows a fourth embodiment of the present invention, wherein a part of a power circuit is shown. Both ends of the resistor 1009 connected to a parallel operation control terminal 1010 are connected to a current comparison circuit 1011. The current comparison circuit 1011 includes an operational amplifier 1101 and a phase-compensating capacitor 1102. An output of the operational amplifier 1101 is connected, as an output of the current comparison circuit 1011, to a reference voltage source 1013 and an error amplifier 1006 via a diode and an addition circuit 1012. If a current value of the local power source is smaller than that of the other (remote) power source, an output voltage of the operational amplifier 1101 increases and voltage is added to the reference voltage source 1013. The voltage applied to the error amplifier 1006 is increased to increase an output voltage of the local power source until an output current balance has been obtained. During this time, the local power source is following up other power sources connected in parallel. Additionally, the output of the operational amplifier 1101 enters a independency-discrimination circuit 1017 as the output voltage of the current comparison circuit 1011. The independency-discrimination circuit 1017 includes a voltage comparator 1104, an output of which then enters the AND circuit 1105 included in a connection circuit 1018. If the output voltage of the current comparison circuit 1011 is positive, since an overvoltage failure cannot occur in the local power source that is following up other power source, an output of the independency-discrimination circuit 1017 becomes low (Lo) to prevent an output of an overvoltage detection circuit 1014 from activating a deactivation signal 1016. Conversely, if the output voltage of the current comparison circuit 1011 is negative, the output of the independency-discrimination circuit 1017 becomes high (Hi), thus permitting the output of the overvoltage detection circuit 1014 to activate the deactivation signal 1016. The present invention can be embodied in this way.

The benefit obtained by implementing the above circuit composition differs according to a particular configuration of the power sources. In such configuration as adopted in the first embodiment, however, it is possible to obtain an improvement in reliability similar to that of the first embodiment.

Although the present embodiment uses an AND circuit to realize a connection circuit, a number of alternative methods are available to form the connection circuit. Use of a technology such as Wired OR makes it possible to realize a function of the connection circuit by connecting two output terminals of an open collector in common and providing a circuit which increases an output voltage only when both outputs are open. Such a circuit also functions as the connection circuit.

Figure 6:
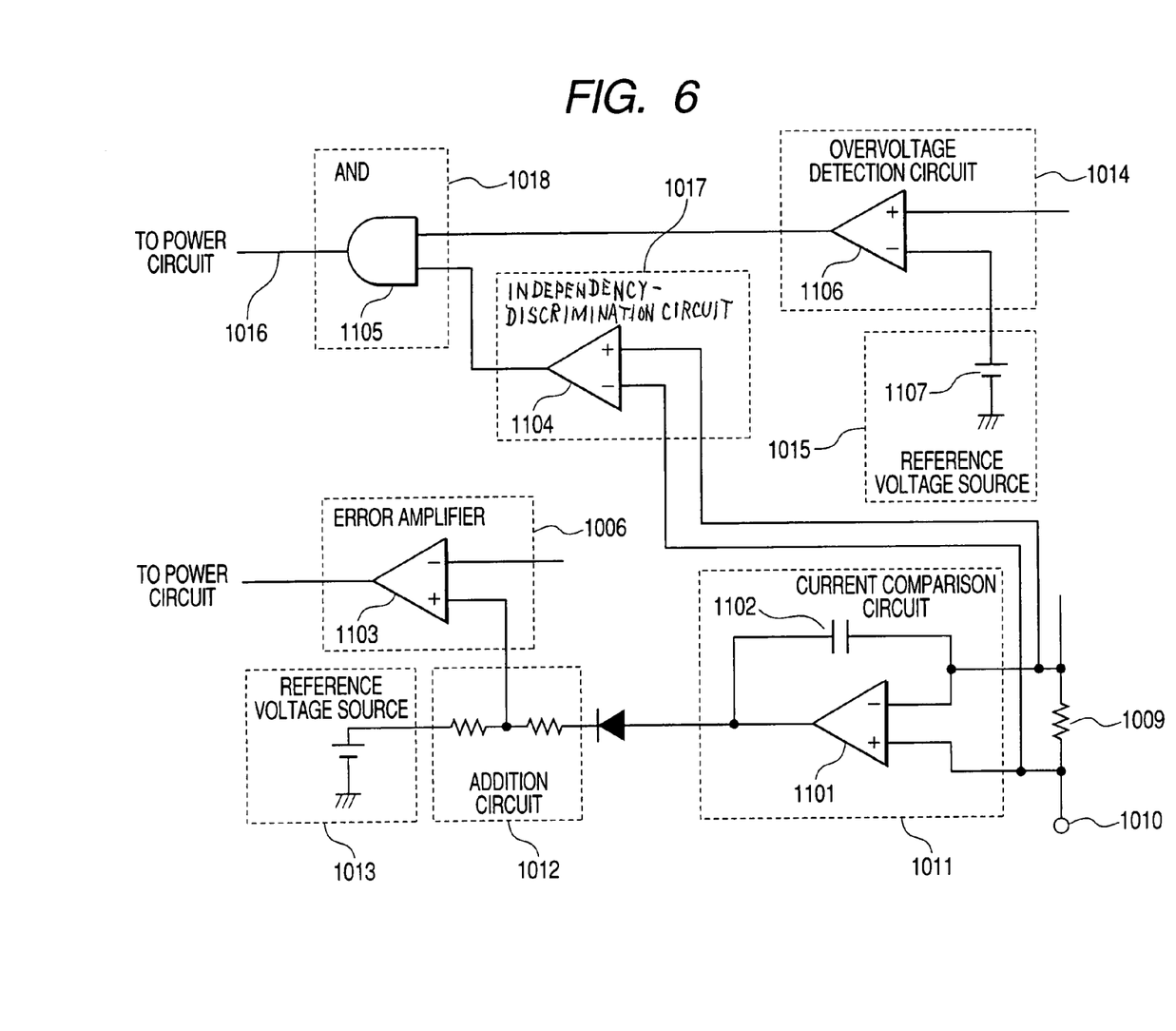
FIG. 6 is a diagram showing a fifth embodiment of the present invention.

FIG. 6 shows a fifth embodiment of the present invention, wherein a part of a power circuit is shown. The present embodiment differs from the fourth embodiment of FIG. 5 in that an input terminal of a independency-discrimination circuit 1017 is connected to the resistor 1009 connected to a parallel operation control terminal 1010. This connection form is the same as that of the second embodiment in FIG. 3.

The benefit obtained by implementing the above circuit composition differs according to a particular configuration of the power sources. In such configuration as adopted in the first embodiment, however, it is possible to obtain an improvement in reliability similar to that of the first embodiment.

Figure 7:
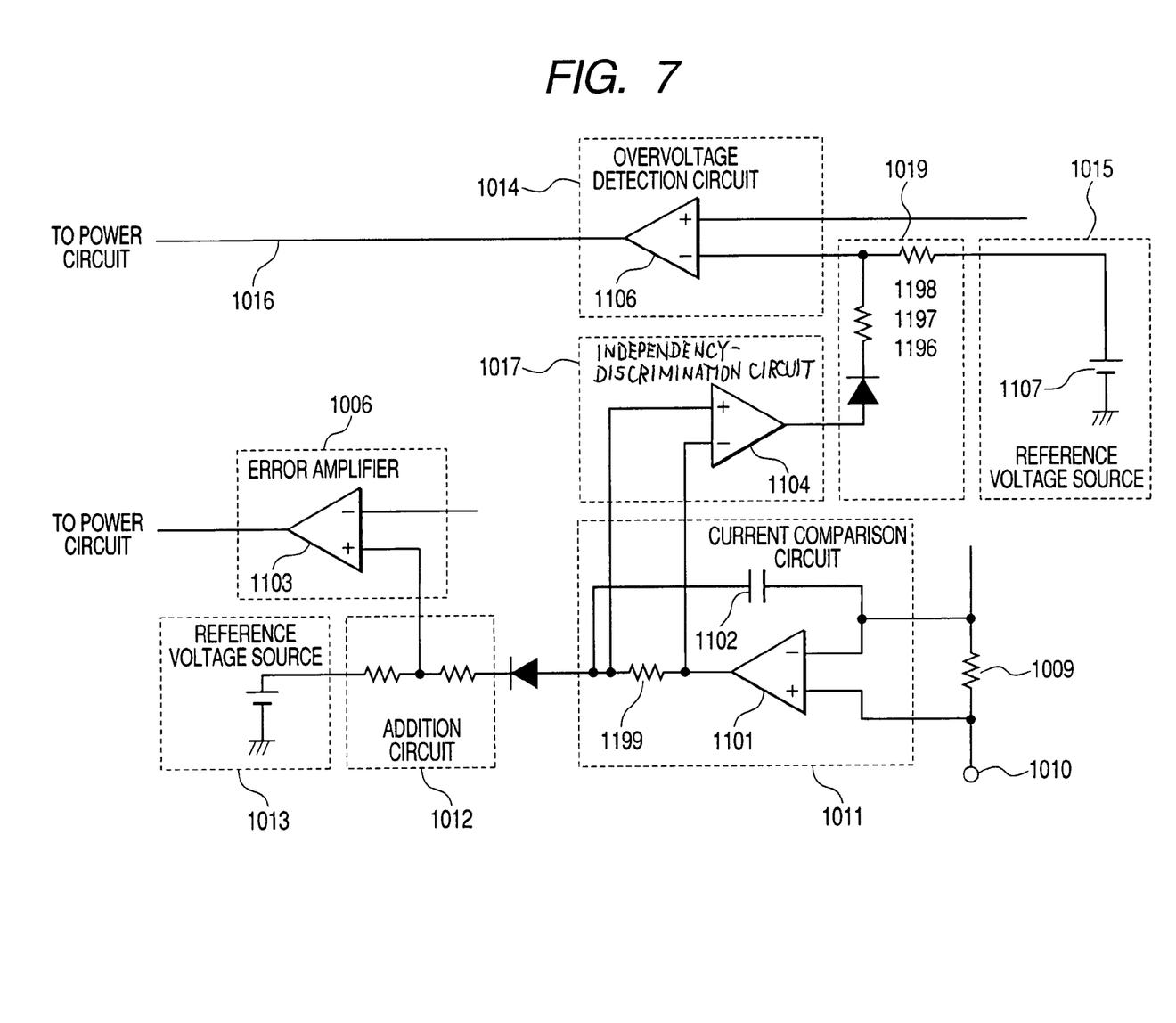
FIG. 7 is a diagram showing a sixth embodiment of the present invention.

FIG. 7 shows a sixth embodiment of the present invention, wherein a part of a power circuit is shown. There are two differences from the fourth embodiment of FIG. 5. One relates to an input of a independency-discrimination circuit 1017, and the other relates to an output thereof. For the input of the independency-discrimination circuit 1017, an element 1199 is connected to an output terminal of an operational amplifier 1101, with both ends of the element 1199 being connected to the independency-discrimination circuit 1017. The element 1199 may be, for example, a resistor or an arrangement of two diodes connected in parallel in opposite directions. The element 1199 has high response characteristics since the voltage developed across the element is kept free from the low-pass filtering effect produced by a phase-compensating capacitor 1102.

For the output of the independency-discrimination circuit 1017, an addition circuit 1019 that includes resistors 1198 and 1197 and a diode 1196 is added, as a connection circuit, to a reference voltage source 1107, and an output of a voltage comparator 1104 is connected to the overvoltage detection circuit 1014. When an output current of the local power source is smaller than that of other power sources, i.e., when an output of a current comparison circuit 1011 is positive and the local power source is following up the remote power source, an output voltage of the independency-discrimination circuit 1017 becomes positive to increase a reference voltage of the overvoltage detection circuit 1014. If an overvoltage failure occurs in a remote power source, an overvoltage detection circuit in the power source where the overvoltage failure has occurred operates first, thus preventing a normal power source from being erroneously deactivated.

The benefit obtained by implementing the above circuit composition differs according to a particular configuration of the power sources. In such configuration as adopted in the first embodiment, however, it is possible to obtain an improvement in reliability similar to that of the first embodiment.

Since the circuits shown in FIGS. 5 to 7 are small in power consumption, these circuits can be easily formed into an integrated circuit (IC). If all circuitry in the range shown, or more circuits, or a part of the circuitry can be formed into an IC and this IC includes a independency-discrimination circuit and a connection circuit or includes the terminals or other elements allowing these circuits to be easily connected, it can be said that the present invention has been implemented. Implemented examples of such ICs include a product such an integrated overvoltage protection circuit applying the technology of the present invention.

All circuitry shown in FIGS. 5 to 7, or more circuits, or a part of the circuitry can be formed using a technology such as digital signal processing (DSP). For example, even when the circuitry is formed using an A/D converter or a D/A converter or even when the circuitry is formed using microcomputer-contained software, if a function similar to that of the above-mentioned independency-discrimination circuit or connection circuit is included, it can be said that the circuitry includes a independency-discrimination circuit or a connection circuit. Hence, it can be said that the present invention has been implemented. Additionally, in either mode of embodiment, the OR diode may be replaced by such an alternative element as an OR FET circuit, or by a circuit not having an OR diode. In either case, the circuit according to the present invention conducts desired operation.

Although power sources not to be current-balanced, i.e., parallel-connected multiple power sources whose output currents are not to be balanced do not require a current comparison circuit, an improvement in reliability similar to that of the above-described embodiments can be obtained by, for example, entering an output of a current detection circuit into a independency-discrimination circuit. An improvement in reliability similar to that of the above-described embodiments can be obtained using other alternative methods. One possible method may be by entering an output of an error amplifier into a independency-discrimination circuit with attention being focused on factors such as the operational characteristics of the error amplifier that its output saturates. Another method may be by giving detection information on switch operation of a switching power source, to a independency-discrimination circuit. Yet another method may be by applying a signal that detects the difference between a voltage of an output terminal and a reference voltage or a target voltage, to an input of a independency-discrimination circuit. In either case, it can be said that a independency-discrimination circuit is included, and this means that the present invention has been implemented.

Figure 8:
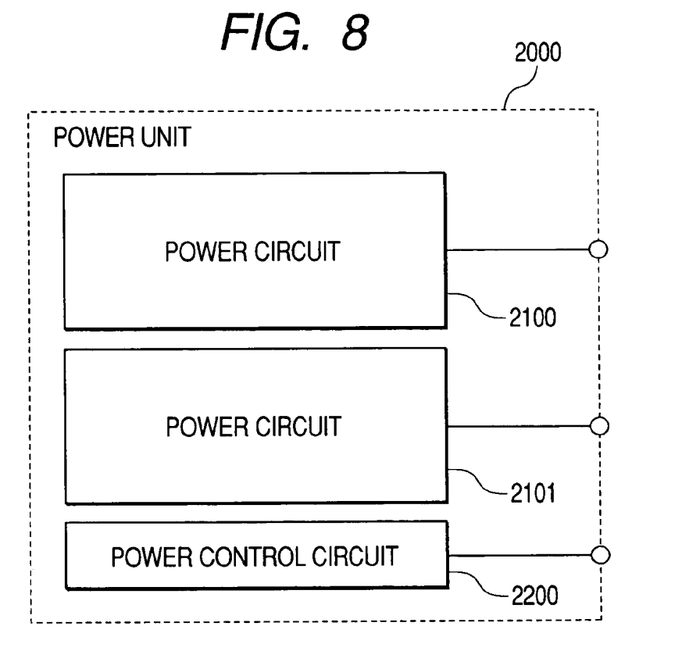
FIG. 8 is a diagram showing a seventh embodiment of the present invention.

FIG. 8 shows a seventh embodiment of the present invention, namely, a power unit. Power circuits 2100 and 2101 are similar to the power circuits of the embodiments described above, and a power control circuit 2200 is also included. A power unit 2000 is constructed of these circuits. The benefit obtained in the present embodiment differs according to factors such as a configuration of power sources. An improvement in reliability similar to that of the first embodiment, however, can be obtained by constructing a power system of such configuration as adopted in the first embodiment.

Figure 9:
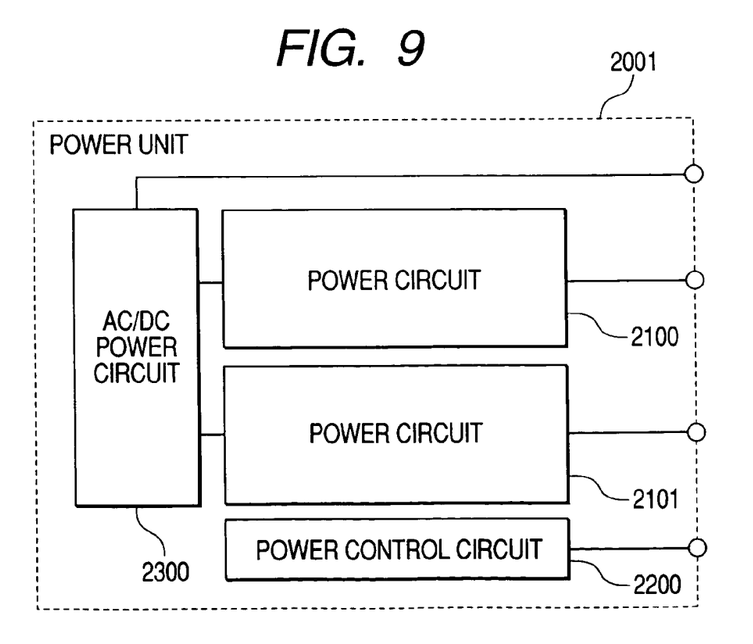
FIG. 9 is a diagram showing an eighth embodiment of the present invention.

FIG. 9 shows an eighth embodiment of the present invention, namely, another power unit. Power circuits 2100 and 2101 are similar to the power circuits of the embodiments described above, and an AC/DC power circuit 2300 and the like are also included. A power unit 2001 is constructed of these circuit elements. The benefit obtained in the present embodiment differs according to factors such as a particular configuration of power sources. An improvement in reliability similar to that of the first embodiment, however, can be obtained by constructing a power system of such configuration as adopted in the first embodiment.

Figure 10:
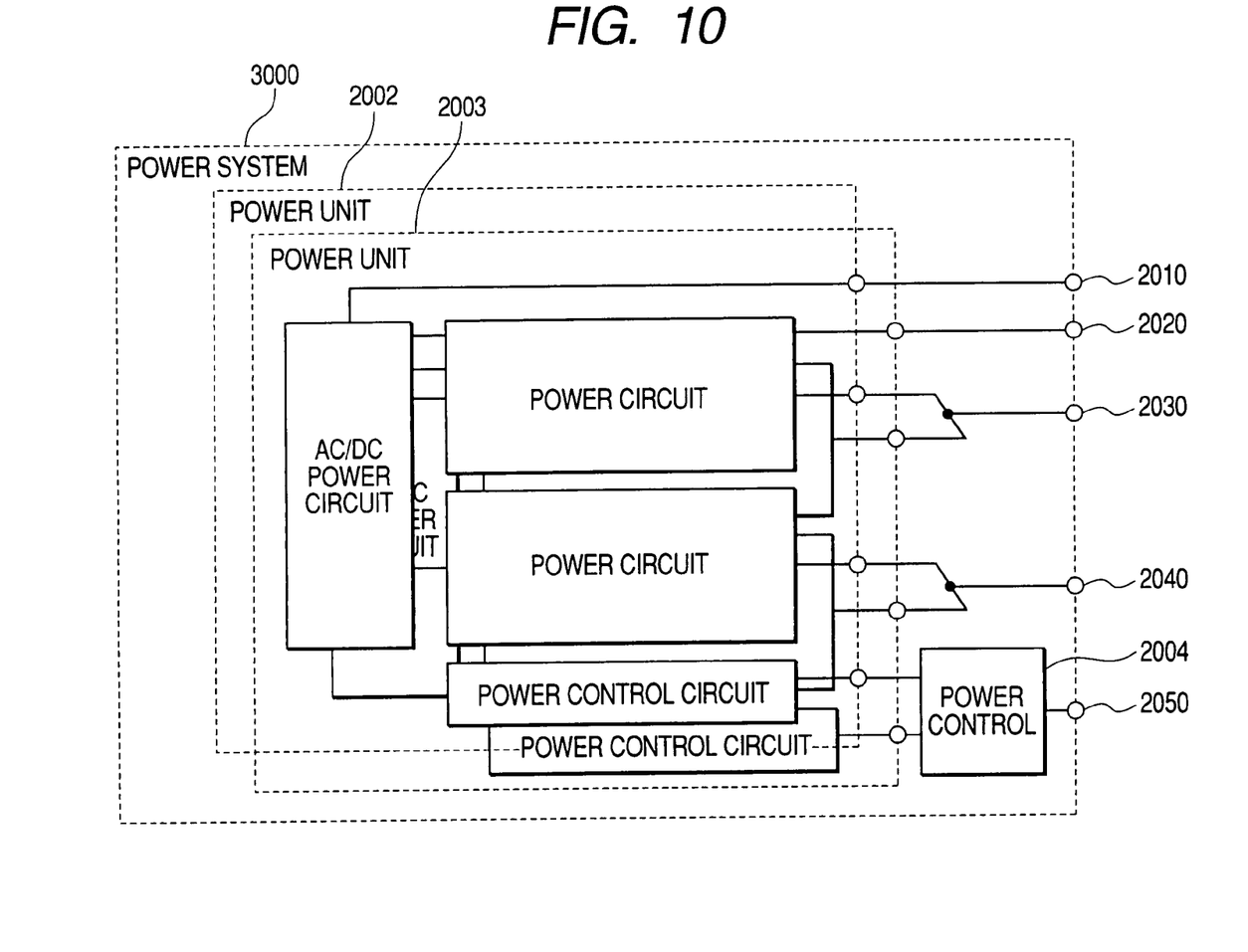
FIG. 10 is a diagram showing a ninth embodiment of the present invention.

FIG. 10 shows a ninth embodiment of the present invention, namely, a power system. In the present embodiment, power units 2002 and 2003 are similar to the power units shown in the eighth embodiment of FIG. 9, and constitute a power system 3000. In the present embodiment, the power system includes a power control 2004 and the like. In FIG. 10, output terminals 2030 and 2040 are output terminals of the power sources formed to take a redundant configuration, input terminals 2010 and 2020 are power input terminals of the power units, and a terminal 2050 is a power control terminal. An benefit of the present embodiment differs according to factors such as a particular configuration of the power sources. An improvement in reliability similar to that of the first embodiment, however, can be obtained by constructing a power system of such configuration as adopted in the first embodiment.

Embodiment of the power system using the technology of the present invention may have various configurations. It may therefore be possible to design a desired configuration of embodiment by judging appropriately according to particular design requirements or application requirements.

Figure 11:
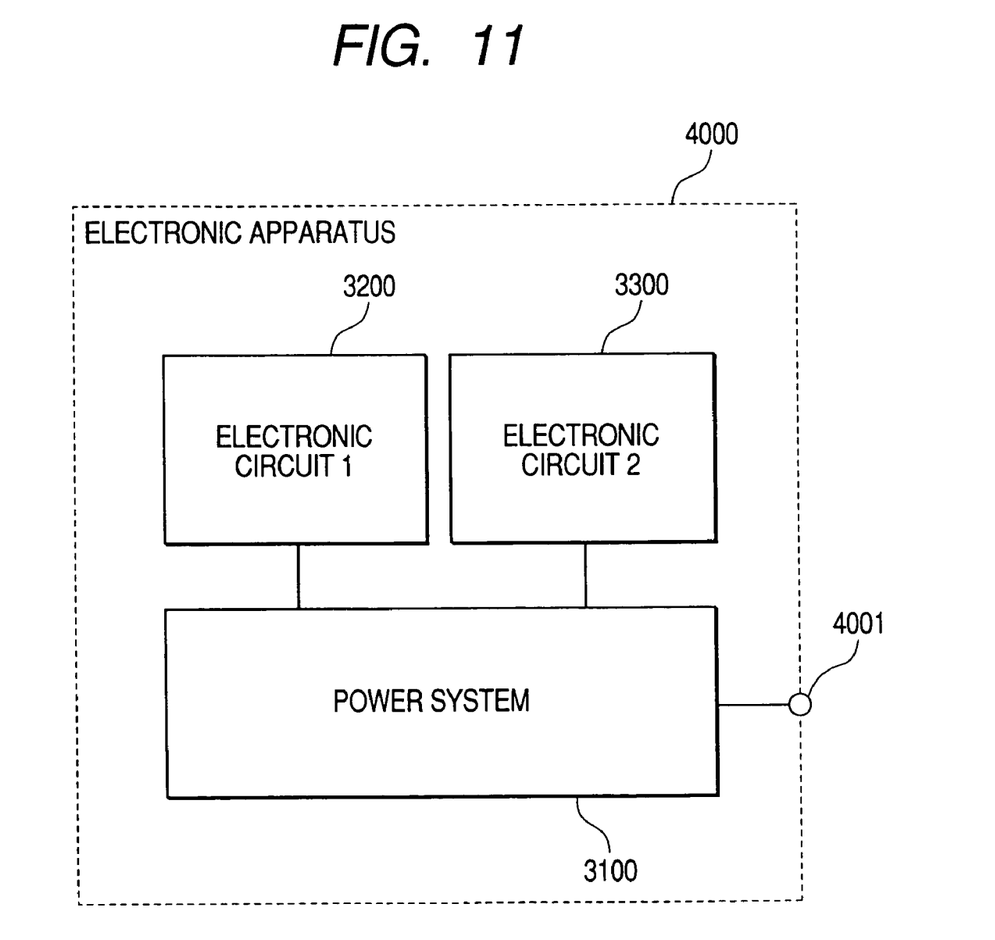
FIG. 11 is a diagram showing a tenth embodiment of the present invention.

FIG. 11 shows a tenth embodiment of the present invention, namely, an electronic apparatus. A power system, 3100 is similar to the power system shown in the ninth embodiment of FIG. 10, supplies power to electronic circuits 3200 and 3300, and constitutes an electronic apparatus 4000. An benefit of the present embodiment differs according to factors such as a particular configuration of power sources. An improvement in reliability similar to that of the first embodiment, however, can be obtained by constructing a power system of such configuration as adopted in the first embodiment.

Embodiment of the electronic apparatus using the technology of the present invention may have various configurations. It may therefore be possible to design a desired mode of embodiment by judging appropriately according to particular design requirements or application requirements. For example, as in an onboard power source, the electronic apparatus may take a configuration in which electronic circuits and a single power circuit are mounted and connected to other power circuits in parallel to allow a redundancy function to be achieved. Other various configurations of embodiment may also be implemented. In either configuration, however, a desired operation and benefit can be obtained by applying the technology of the present invention.

In addition to the methods shown for the above embodiments, parallel operation schemes not using a current comparator, such as a droop scheme, are available to implement parallel operation of power sources. Even when these schemes are employed, however, a similar improvement in reliability can be obtained by applying signals to a independency-discrimination circuit using an element capable of detecting the magnitude of output currents or output voltages of the power sources that have been placed in parallel operation.

Additionally, the multiple power sources operated in parallel may belong to different circuits or may be of different specifications. For example, if power sources each having a different output current capability are operated in parallel, the output currents generated during the parallel operation of these power sources may not be equal, for which reason, circuits may need to be designed so that, for example, a current proportional to the output current capability is output. Even in this case, it is possible to conduct designs so that the magnitude of output currents or output voltages can be discriminated by, for example, confirming that a designed current ratio has been exceeded during the operation of the independency-discrimination circuit. In short, an appropriate circuit design can be conducted according to individual conditions or situations. In either case, an improvement in reliability similar to that shown for the above embodiments can be obtained.

The present invention has been embodied as a result of the inventors having clarified the importance of the overvoltage failure mode. That is to say, although it was known that there are an undervoltage failure mode and an overvoltage failure mode as the failure modes of power sources, and although it was understood that the overvoltage failure mode seldom occurs, the inventors have created power sources each having a function that records the occurrence of the overvoltage failure mode, and have conducted field data collections in large quantities and over long periods of time. As a result, the inventors have found that the overvoltage failure mode occurs at unignorable ratios from 10% to 20% and that the overvoltage failure mode significantly deteriorates the reliability of a redundant power system, and have realized the technology of the present invention.

As heretofore detailed using the embodiments, according to the technology of the present invention, in the redundant configuration, reliability of power sources, a power supply system, or an electronic apparatus is improved by 20,000 times, which means an improvement 4,000 times greater than the reliability improvement of about five times achievable in the conventional technology. Applying the technology of the present invention to an overvoltage protection circuit, power sources, a power supply system, or an electronic apparatus, allows reliability to be greatly improved.

What is claimed is:

1. An over-voltage protection circuit comprising:
    a stabilized power source:
    a control circuit for controlling an output current of said power source such that the output current is balanced over power sources when said power source is connected in parallel to one or plural other power sources;
    a independency-discrimination circuit adapted to output a predetermined over-current output signal when the output current detected by said control circuit is greater than those of the other power sources;
    an over-voltage detection circuit adapted to output a predetermined over-voltage signal when the output voltage of said power source is greater than a predetermined voltage; and
    a connection circuit adapted to disable said power source when said predetermined over-current output signal and said over-voltage output signal are concurrently output by said independency-discrimination circuit and said over-voltage detection circuit, respectively.

2. A power supply system including the over-voltage protection circuit of claim 1.

3. An electronic apparatus including the power supply system of claim 2.

4. An electronic apparatus including the over-voltage protection circuit of claim 1.

5. An over-voltage protection circuit as claimed in claim 1, wherein said connection circuit is adapted to disable said power source, when both the interdependency-discrimination circuit discriminates that the output current detected by said control circuit is greater than those of the other power sources, and the over-voltage detection circuit detects that the output voltage of said power source is greater than the predetermined voltage.

6. An over-voltage protection circuit as claimed in claim 5, wherein said power source is arranged to disable its power source output operations, responsive to said connection circuit when both the interdependency-discrimination circuit discriminates that the output current detected by said control circuit is greater than those of the other power sources, and the over-voltage detection circuit detects that the output voltage of said power source is greater than the predetermined voltage.

7. A stabilized power source comprising:
    a control circuit for controlling an output current of a power source such that the output current is balanced over power sources when said power source is connected in parallel to one or plural other power sources;
    a independency-discrimination circuit adapted to output a predetermined over-current output signal when the output current detected by said control circuit is greater than those of the other power sources;
    an over-voltage detection circuit adapted to output a predetermined over-voltage signal when the output voltage of said power source is greater than a predetermined voltage; and
    a connection circuit adapted to disable said power source when said predetermined over-current output signal and said over-voltage output signal are concurrently output by said independency-discrimination circuit and said over-voltage detection circuit, respectively.

8. A power supply system including the stabilized power source of claim 7.

9. An electronic apparatus including the power supply system of claim 8.

10. An electronic apparatus including the stabilized power source of claim 7.

11. A power source as claimed in claim 7, wherein said connection circuit is adapted to disable said power source, when both the interdependency-discrimination circuit discriminates that the output current detected by said control circuit is greater than those of the other power sources, and the over-voltage detection circuit detects that the output voltage of said power source is greater than the predetermined voltage.

12. A power sources as claimed in claim 11, wherein said power source is arranged to disable its power source output operations, responsive to said connection circuit when both the interdependency-discrimination circuit discriminates that the output current detected by said control circuit is greater than those of the other power sources, and the over-voltage detection circuit detects that the output voltage of said power source is greater than the predetermined voltage.

13. An overyoltage protection circuit comprising:
    a power circuit which has an over-voltage detection circuit for detecting an increase in output voltage under an abnormal state and transmitting a power source operation deactivation signal for deactivation of said power circuit, wherein said power circuit is connected in parallel to other power circuits, and also has a control circuit for controlling an output voltage level of said power circuit according to a particular level of an output current thereof such that the output current is balanced with respect to those of the other power circuits at a predetermined distribution ratio;
    a independency-discrimination circuit adapted to output a current-discrimination signal for discriminating whether the output current detected by said control circuit is increasing or decreasing against the predetermined distribution ratio; and
    a connection circuit which, if the signal output from said independency-discrimination circuit indicates a decrease against the predetermined distribution ratio, prevents said over-voltage detection circuit from transmitting the deactivation signal, and if the signal output from said independency-discrimination circuit indicates an increase against the predetermined distribution ratio, operates to make the transmission of the deactivation signal from said over-voltage detection circuit valid to deactivate said power circuit.

14. The over-voltage protection circuit according to claim 13, wherein said connection circuit is a circuit which, when the signal output from said independency-discrimination circuit indicates a decrease against the predetermined distribution ratio, operates to increase the detection voltage of said over-voltage detection circuit.

15. A power supply system including the over-voltage protection circuit of claim 13.

16. An electronic apparatus including the over-voltage protection circuit of claim 13.

17. An over-voltage protection circuit as claimed in claim 13, wherein said connection circuit operates to transmit the deactivation signal to the power circuit, when both of the signal output from said interdependency-discrimination circuit indicates an increase against the predetermined distribution ratio, and the over-voltage detection circuit detects the increase in output voltage under the abnormal state.

18. An over-voltage protection circuit as claimed in claim 17, wherein said power circuit is arranged to disable its power output operations, when said connection circuit operates to transmit the deactivation signal to the power circuit.

* * * * *